United States Patent
Sarabi et al.

(10) Patent No.: US 12,107,749 B2
(45) Date of Patent: Oct. 1, 2024

(54) ADAPTIVE NETWORK PROBING USING MACHINE LEARNING

(71) Applicant: THE REGENTS OF THE UNIVERSITY OF MICHIGAN, Ann Arbor, MI (US)

(72) Inventors: Armin Sarabi, Ann Arbor, MI (US); Mingyan Liu, Ann Arbor, MI (US); Kun Jin, Ann Arbor, MI (US); Tongxin Yin, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 18/033,834

(22) PCT Filed: Oct. 25, 2021

(86) PCT No.: PCT/US2021/056465
§ 371 (c)(1),
(2) Date: Apr. 26, 2023

(87) PCT Pub. No.: WO2022/093697
PCT Pub. Date: May 5, 2022

(65) Prior Publication Data
US 2023/0403225 A1 Dec. 14, 2023

Related U.S. Application Data

(60) Provisional application No. 63/105,492, filed on Oct. 26, 2020.

(51) Int. Cl.
*H04L 43/12* (2022.01)
*G06N 20/20* (2019.01)
(Continued)

(52) U.S. Cl.
CPC ............. *H04L 43/12* (2013.01); *G06N 20/20* (2019.01); *H04L 41/147* (2013.01); *H04L 41/16* (2013.01)

(58) Field of Classification Search
CPC ....... H04L 43/12; H04L 41/147; H04L 41/16; G06N 20/20; G06N 5/01
See application file for complete search history.

(56) References Cited

U.S. PATENT DOCUMENTS

| 11,039,367 B1 * | 6/2021 | Vivanco | H04W 36/08 |
| 2004/0165531 A1 * | 8/2004 | Brady | H04L 47/826 |
| | | | 370/252 |

(Continued)

OTHER PUBLICATIONS

Lee, S. et al. Supervised Learning-Based Fast, Stealthy, and Active NAT Device Identification Using Port Response Patterns. Symmetry, 12(9), 1444 (pp. 1-17). MDPI. Sep. 2, 2020.

(Continued)

*Primary Examiner* — Ramy M Osman
(74) *Attorney, Agent, or Firm* — Harness, Dickey & Pierce, P.L.C.

(57) ABSTRACT

A computer-implemented method is presented for scanning a computer network. The method includes: a) sending a particular network probe to a network address in a computer network; b) receiving a response to the network probe from the network address; c) appending the response to a set of features forming a feature vector; d) determining a next network probe to conduct at the network address; and e) predicting, by the computer processor, the response from the next network probe using the feature vector and a model, where the model is trained using a machine learning method and outputs a probability that a given network address will respond to a network probe.

17 Claims, 3 Drawing Sheets

(51) Int. Cl.
  *H04L 41/147* (2022.01)
  *H04L 41/16* (2022.01)

(56) References Cited

U.S. PATENT DOCUMENTS

| | | | |
|---|---|---|---|
| 2010/0223093 A1* | 9/2010 | Hubbard | G06Q 30/02 706/20 |
| 2011/0235544 A1 | 9/2011 | Head et al. | |
| 2013/0159219 A1* | 6/2013 | Pantel | G06N 20/00 706/45 |
| 2016/0232311 A1* | 8/2016 | Segal | G06N 20/00 |
| 2017/0134474 A1* | 5/2017 | Gao | H04L 67/125 |
| 2017/0206553 A1* | 7/2017 | Lintermans | G06Q 30/0277 |
| 2020/0110823 A1 | 4/2020 | Steuer et al. | |
| 2021/0067380 A1* | 3/2021 | Hegde | H04L 41/0809 |
| 2021/0158227 A1* | 5/2021 | Budzik | G06N 5/01 |
| 2021/0168165 A1* | 6/2021 | Alsaeed | H04L 63/1433 |
| 2023/0403225 A1* | 12/2023 | Sarabi | H04L 41/16 |

OTHER PUBLICATIONS

Sarabi, A. et al. Characterizing the Internet Host Population Using Deep Learning: A Universal and Lightweight Numerical Embedding. In Proceedings of the Internet Measurement Conference 2018 (pp. 133-146). ACM. Oct. 16, 2018.

Bano, S. et al. Scanning the Internet for Liveness. ACM SIGCOMM Computer Communication Review, 48(2) (pp. 2-9). ACM. May 1, 2018.

International Search Report and Written Opinion regarding International Application No. PCT/US2021/56465, dated Feb. 1, 2022; ISA/US.

* cited by examiner

ADAPTIVE NETWORK PROBING USING MACHINE LEARNING

CROSS-REFERENCE TO RELATED APPLICATIONS

This application is a 371 U.S. National Phase of International Application No. PCT/US2021/056465, filed on Oct. 25, 2021, which claims the benefit of U.S. Provisional Application No. 63/105,492, filed on Oct. 26, 2020. The entire disclosures of the above applications are incorporated herein by reference.

GOVERNMENT CLAUSE

This invention was made with government support under CNS1939006, and CNS1616575 awarded by the National Science Foundation. The government has certain rights in the invention.

FIELD

The present disclosure relates to adaptive network probing using machine learning.

BACKGROUND

The proliferation of Internet-connected devices has given rise to network scanning techniques for giving visibility into the public Internet. Tools, such as ZMap and NMap, are used for performing Internet-wide scans, recording snap-shots of visible devices on the Internet across many ports. These measurements have various applications in Internet measurement and security, e.g., to detect and fingerprint networked devices, study trends in the Internet ecosystem, examine security events, and enable machine learning analysis.

However, Internet scans produce large amounts of traffic, especially when networks are probed across multiple ports and by various entities. In many cases, the intrusive nature of scans leads to network administrators opting out of benign research measurements. To alleviate this issue, researchers often limit the rate of scans, spread out their bandwidth by traversing addresses in a random order, and refrain from probing many ports simultaneously or with close proximity. Consequently, IP addresses on the same network, or different ports of a single IP address, may be probed at different times and the resulting scans are more likely to be subject to churn. Note, however, that most IP addresses on the public Internet are either unresponsive to probes, or do not accept incoming traffic (i.e., respond with RST or ICMP unreachable packets). Measurements conducted during April and May of 2020 using 51 different probes show that only 22.1% of IPv4 addresses announced on BGP are active/live, with an active host accepting traffic for 1.7/51 probes on average. Therefore, much of the bandwidth of exhaustive network scans is wasted on inactive hosts, especially on ports with very low numbers of active IP addresses (e.g., we observe <0.2% active hosts for 28/51 of our probes). Thus, if one targets only active IP addresses and their corresponding active ports, this can accelerate network scans and reduce their footprint by refraining from sending unnecessary probes. Toward this end, this disclosure proposes reducing the bandwidth of network scans by predicting active hosts.

This section provides background information related to the present disclosure which is not necessarily prior art.

SUMMARY

This section provides a general summary of the disclosure, and is not a comprehensive disclosure of its full scope or all of its features.

A computer-implemented method is presented for scanning a computer network. The method includes: a) sending a particular network probe to a network address in a computer network; b) receiving a response to the network probe from the network address; c) appending the response to a set of features forming a feature vector; d) determining a next network probe to conduct at the network address; and e) predicting, by the computer processor, the response from the next network probe using the feature vector and a model, where the model is trained using a machine learning method and outputs a probability that a given network address will respond to a network probe.

The method further includes sending another network probe to the network address in response to the probability that a given network address will respond exceeds a threshold. Upon receiving a response to the another network probe from the network address, steps b)-e) are repeated for the response from the another network probe.

In one example implementation, the network probes are sent to particular ports at the network address. In this example, the method includes: a) sending a network probe to a particular port at a network address in a computer network; b) receiving a response to the network probe from the network address; c) appending the response to a set of features forming a feature vector; d) determining a next port at the network address to probe; and e) predicting the response from the next port using the feature vector and a model, where the model is trained using a machine learning method and outputs a probability that a given port will respond to a network probe.

Another network probe may be sent to the next port at the network address when the probability that a given port will respond exceeds a threshold. The next port may be selected in in accordance with a sequence of probes. In one implementation, the sequence of probes is determined by training a set of classifiers with training data, where the training data represents a plurality of network probes across a set of different types of ports and features in the set of classifiers include responses from the set of different types of ports; quantifying contributions of each feature in the set of classifiers; and ordering ports in the set of different types of ports to form the predefined sequence, where the ports are ordered according to importance of a given port for predicting response of another port.

In another aspect of this disclosure, a computer-implemented method is presented for predicting a response of a port in a computer network. The method includes: receiving a data set representing a plurality of network probes in a computer network, where each entry in the data set includes a network address for a given network probe and an indicator of the response to the given network probe; determining a geographic location for the network address associated with each entry in the data set; constructing a series of feature vectors from the data set, where each feature vector includes a network address for a network probe, a geographic location for the network address and an indicator of the response given by the network address to a network probe; and training a model with a machine learning method using the series of feature vectors, where the model outputs a probability that a given network address will respond to a request.

The method may further include determining ownership of a network address associated with each entry in the data set; and constructing the series of feature vectors using ownership information for the network addresses. In one example, ownership of a network address is further defined as an identifier for an Internet service provider and an identified for an autonomous system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
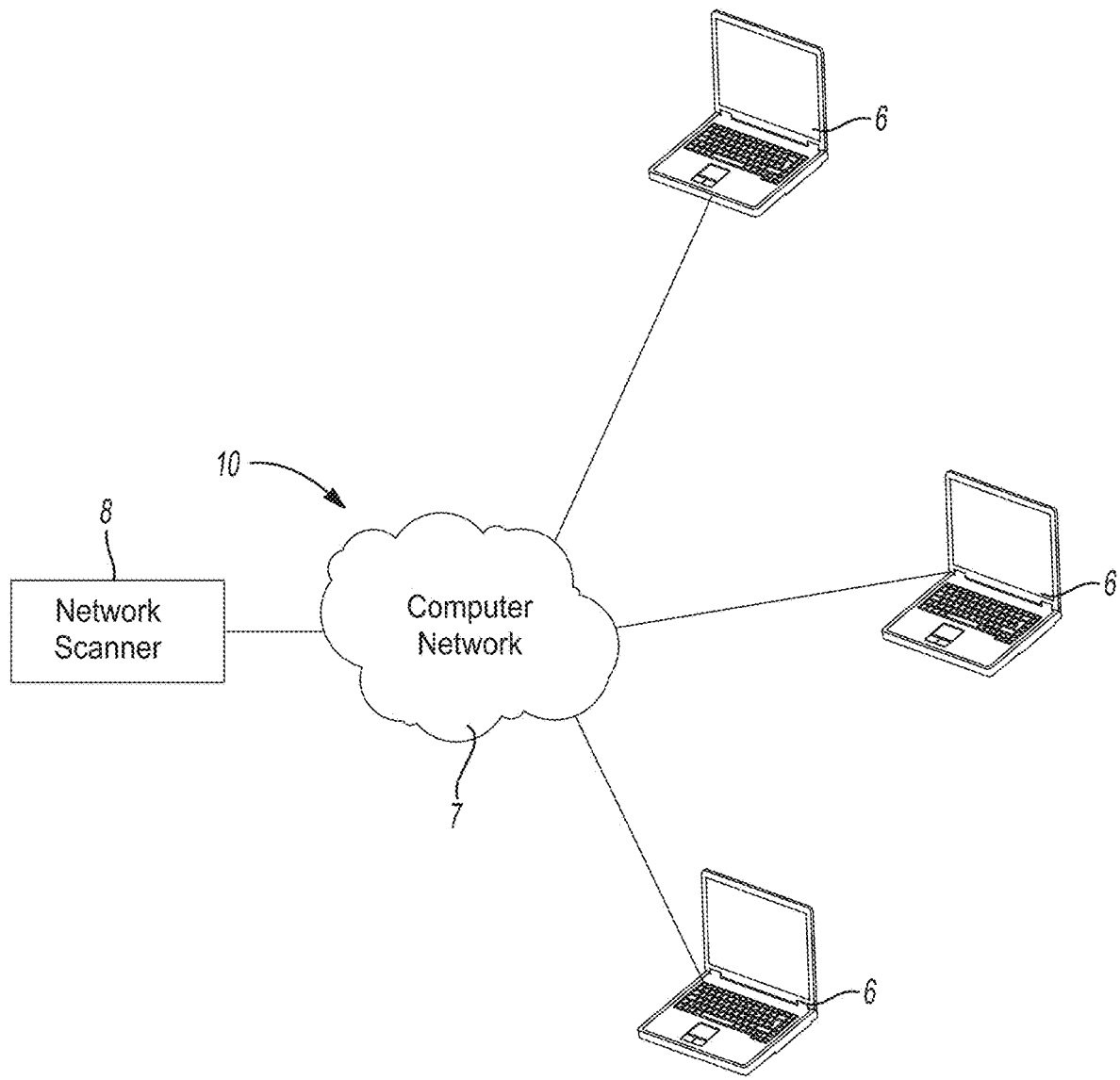
FIG. 1 is a diagram depicting a simplified network architecture.

FIG. 1 depicts a simplified network architecture 4. The network architecture 4 includes a plurality of network devices 6 interconnected by a network 7. A network scanner 8 is also connected to the computer network 7 and operates to send network probes across the network to different network devices. Of note, the network scanner 8 implements adaptive network probing using machine learning as will be further described below.

For this disclosure, intelligent scans are examined using single-packet stateless probes, including TCP, UDP, and ICMP echo (i.e., ping) probes. For TCP probes, this involves sending a TCP SYN packet to a port of an arbitrary host, and recording the response, if any; e.g., a TCP SYN-ACK or an RST packet. UDP and ICMP probes are stateless by definition; the former can be followed by an application-specific UDP packet or an ICMP destination unreachable response, and the latter with an ICMP echo reply. In one example, the ZMap network scanner is used for conducting probes. Single-packet scans are used to detect active hosts (to be defined shortly) while minimizing the generated traffic. Nevertheless, once the set of active hosts for a given probe has been obtained, it is possible to follow up this method with stateful (or application-layer) scans such as ZGrab, in order to further characterize hosts by obtaining headers/banners, certificates, and so forth. Other types of network probes are also contemplated by this disclosure.

Based on if and how an IP address responds to a probe, it can be categorize using the following definitions: responsive IP, active/line IP and responsive inactive IP. An IP is responsive for probe k if it replies to the probe. An IP address is responsive if it is responsive to any of the performed probes. A responsive IP for probe k is active/live if it is configured to communicate over the underlying protocol; this means replying with a SYN-ACK packet for a TCP SYN scan, or a UDP packet for a UDP probe, hence indicating an open port. An active/live IP address is one that is active for at least one probe. An IP is responsive but inactive if it replies with a TCP RST or an ICMP unreachable packet for TCP and UDP probes, respectively, signaling a closed port. Note that for an ICMP echo request, responsiveness and liveness are equivalent. Also, since a probe is for a specific port (with the exception of ICMP which is port less), whenever there is no ambiguity one can use the two words "probe" and "port" interchangeably from time to time.

Figures 2, 3:
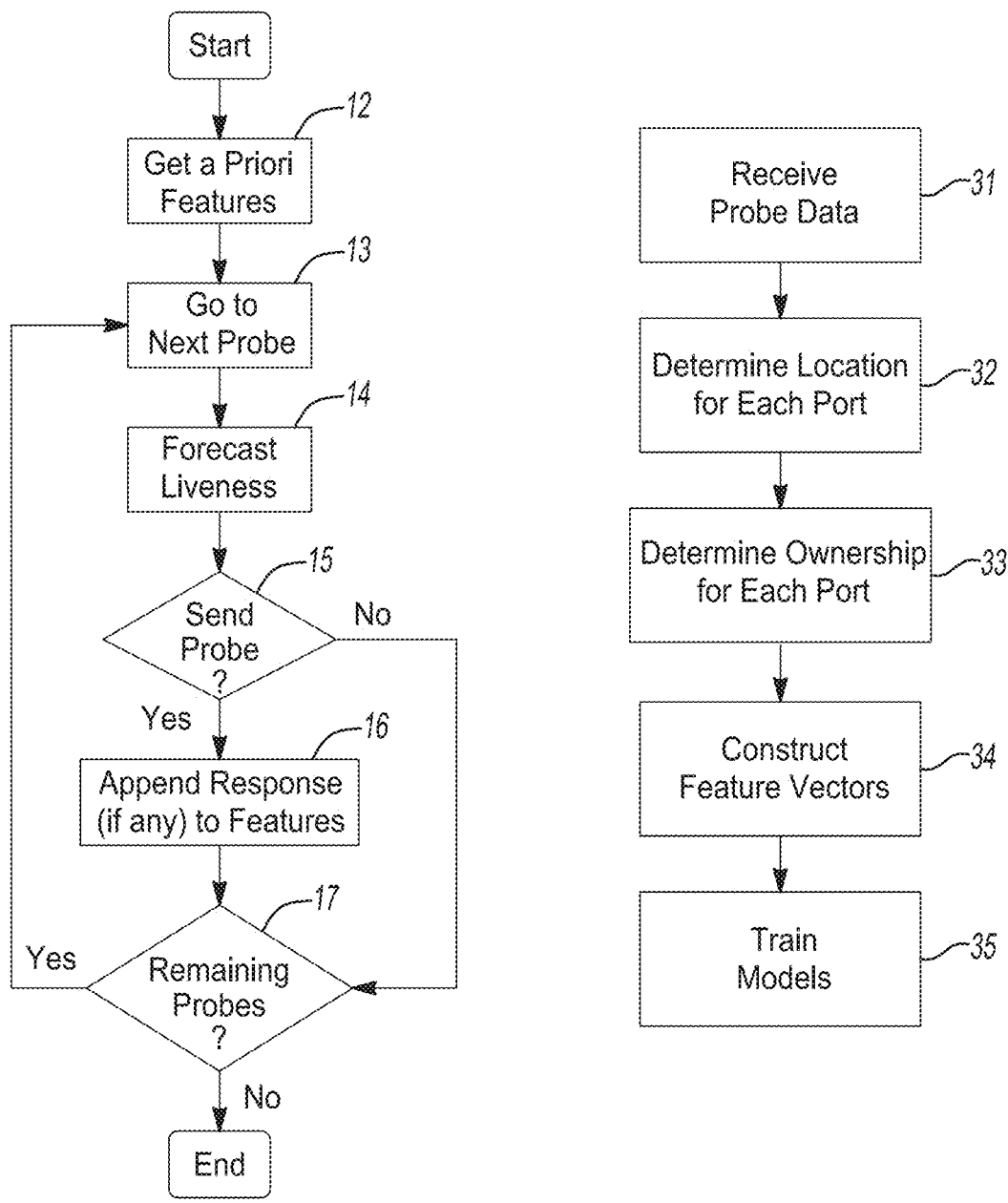
FIG. 2 is a diagram illustrating a method for performing intelligent scans of a computer network.
FIG. 3 is a diagram illustrating a method for training models to predict a response of a network port.

FIG. 2 illustrates a proposed method for performing intelligent scans of a computer network. As shown, the sequential nature of the scans refers to the sequencing of probes for a given IP address, where the decision of whether to send the next probe/scan to the IP address is determined by results from previous probes. In an example embodiment, the order of probes (or port to be probed) is determined in accordance with a predefined sequence of probes. It is envisioned that the order of probes could be determined dynamically as well.

As a starting point, a priori features can be used to predict whether a given IP address will respond to a network probe as indicated at 12. In the example embodiment, models are trained using machine learning methods with a priori features, such as location and ownership information. The models are trained to output a probability that a given IP address will respond to a network probe. The models are then used at 14 to decide whether to send the network probe to the network address (or a port at the network address) or skip sending of the network probe.

More specifically, the response for the next probe is predicted using a feature vector and the model. When the probability that the next probe will respond exceeds a threshold, then that next network probe is sent to that network address as indicated at 15. On the other hand, when the probability that the next network probe will respond is less than the threshold, the network probe is not sent.

In some embodiments, the network probe is sent to a particular port at the network address. Upon receiving a response to the network probe, the response is appended at 16 to a set of features forming a feature vector. In the absence of a response to the network probe, the method moves to the next network probe to be interrogated as indicated at 17. Likewise, if a network probe was not sent to the particular port, the method moves to the next network probe to be interrogated as indicated at 17.

The next network probe is determined at 13 in accordance with the predefined sequence of probes. The steps are repeated for the next network probe until all of the probes at the network address have been processed. This sequential setting allows one to append features obtained from each completed/performed probe for boosting performance over subsequent probes.

Note that this technique can also be used to forecast and scan IP addresses themselves based on their predicted responsiveness or liveness, i.e., one could use the same technique to determine whether to scan IP addresses to attain a certain coverage over responsive or live IPs. However, the remainder of this disclosure focuses on discovering live hosts, as the mechanism for indicating closed ports (replying with TCP RST/ICMP unreachable, or not replying at all) which are often not of interest to Internet scanners, while the detection of responsive yet inactive hosts can significantly increase the footprint of scans.

To obtain ground-truth data for training models and evaluating the performance of this framework, one can conduct exhaustive scans on a small randomly selected subset of the Internet (~0.7% of public IPv4 addresses). This allows one to procure representative data sets that are further split into training data and testing data.

The efficiency of the proposed network scanner 8 relies on the machine learning model's ability to distinguish between active and inactive hosts. The model's performance can be quantified using the following metrics: the coverage or true positive rate (TPR) of the model's predictions, which is the percentage of discovered active hosts, and the corresponding probing rate, which is the portion of probed IPs needed to probe to reach a certain coverage.

More formally, let IPs be denoted by $i \in \{1, \ldots, N\}$, and each probe to be denoted by $k \in \{1, \ldots, M\}$. Take $x_{i,k}$ to be the features obtained from IP i by conducting probe k, with $x_{i,o}$ containing a priori features, i.e., location and ownership properties of IP i. Let $f_k(\bullet)$ denote the model for forecasting liveness on probe k, with $\hat{y}_{i,k} = f_k(\{x_{i,k}, k \in S_k\})$ denoting the model's output, where $S_k \subset \{0, \ldots, M\}$ specifies the set of probes available to the model right before sending probe k. The scanner can decide to send/suppress probes by thresholding $\hat{y}_{i,k}$, in other words, probe an IP when $\hat{y}_{i,k} \geq t_k$ (for some threshold $t_k$); otherwise, predict that a response is unlikely and refrain from sending the probe. Take $y_{i,k} \in \{0, 1\}$ to be the true label of IP i for port k, with $y_{i,k} = 1$ indicating a live host on this port. Then define the coverage $c_k$ and probing rate $r_k$ as follows:

$$c_k = \frac{\sum_{i=1}^{N} 1\{\hat{y}_{i,k} \geq t_k, y_{i,k} = 1\}}{\sum_{i=1}^{N} 1\{y_{i,k} = 1\}},$$

$$r_k = \frac{\sum_{i=1}^{N} 1\{\hat{y}_{i,k} \geq t_k\}}{N}.$$

Note that for each probe, a different threshold $t_k$ can be used. The number of live hosts can vary greatly across different probes/ports. The scanning method aim to discover live hosts for all probes regardless of their popularity, especially since sparsely populated protocols sometimes indicate security vulnerabilities, and their discovery is crucial for gauging the security posture of hosts. Therefore, a unique threshold is used for each probe in order to guarantee consistent coverage across all probes, which adds as a tunable hyperparameter In order to obtain representative snapshots of the Internet, partial scans were conducted using ZMap during April and May of 2020. 25 million random IP addresses (~0.7% of public IPv4 addresses) were selected for each snapshot, change the selection of IPs between snapshots, and scan them across 51 probes, most of which are also commonly scanned by the Censys database for providing global snapshots of visible devices on the Internet. Note that scan were performed instead of using existing databases to ensure all scans are performed within close proximity of each other (all scans for a snapshot are done within 3 hours), thus minimizing churn. Performing scans also allows one to collect headers, such as TTL values, and record responsive but inactive hosts, which are not reported by existing databases. Addresses are selected from the public IPv4 space, excluding private, reserved, and multicast address blocks, resulting in ~3.7 billion addresses (221/8 blocks).

Tables 1 and 2 are found in the appendix below and display TCP, UDP, and ICMP probes that are collected in the measurements, along with the average (across all snapshots) percentage of IPs announced on border gateway protocol (BGP) that are live for each probe. Overall, 51 probes were conducted, consisting of 42 TCP probes, 8 UDP probes, and an ICMP echo request. Note that multiple probes are conducted on some UDP ports: SNMP scans on UDP port 162 are probed over SNMPv1, SNMPv2, and SNMPv3; for DNS resolvers on port 53, one BIND version query is performed, and a DNS lookup for an A record for www.google.com; for NTP services on UDP port 123, a standard query is performed and a monlist command; hosts that respond to the latter are prone to NTP amplification attacks for amplifying DDoS traffic. For each snapshot, all 51 probes are performed on 25 million randomly selected addresses. Measurements were performed weekly between 2020 Apr. 4 and 2020 May 30, resulting in 9 snapshots. Table 3 shows the number of responsive and active IPs for each snapshot.

In addition to the main scan dataset detailed above, auxiliary data sets are also used to capture public IPs announced on border gateway protocol (BGP), and obtain a priori attributes for boosting the prediction accuracy of the scanning method.

While measurements are conducted on the public IPv4 space, roughly 23% of addresses in this space are not announced on BGP, resulting in 2.9 billion announced IPs (170/8 blocks). BGP prefixes corresponding to the date of each snapshot was obtained from Routeviews prefix to AS mappings (pfx2as). While one does not expect to receive responses from IP addresses not announced on BGP, a small number (between 32 and 111 for all snapshots) of active IP addresses were observed in this space, possibly due to subnets not captured by Routeviews, and the small time misalignment between the snapshots and Routeviews data. Nevertheless, unannounced IPs account for less than 0.003% of active IPs in each snapshot; this would give machine learning models an unfair advantage by allowing them to reduce their probing rate by 23% with a negligible reduction in coverage. Therefore, these IPs were removed from the analysis, and the scanning methods were evaluated over addresses announced on BGP.

Location and ownership information were obtained from Maxmind GeoLite2 and GeoIP2 ISP databases. The GeoLite2 database offers geolocation data including city, subdivisions (e.g., state), postal code, country, continent, time zone, and latitude/longitude, and is updated weekly. Each of the snapshots are paired with the most recent Maxmind data set prior to the scans. The GeoIP2 ISP database includes ownership information, such as ISP, organization, and autonomous system number/organization.

To feed the aforementioned data into machine learning algorithms, numerical representations of the data are extracted for each IP address. For scan data sets, the following features were extracted from TCP, UDP and ICMP probes. For unresponsive IPs, all the following values are set to zero. For TCP probes, the IP identification (IP-ID), time to live (TTL), window size, and the classification of the response packet (SYN-ACK or RST, encoded using one-hot encoding) were extracted. For UDP probes, the IP ID, TTL, and the packet classification (UDP or ICMP destination unreachable, encoded using one-hot encoding) were extracted. Additionally, for UDP packets the packet length was extracted, and for ICMP destination unreachable messages, the ICMP code (using one-hot encoding) was captured. For the ICMP echo probe, the IP ID, TTL, and whether the host responded to the request was extracted.

For IP intelligence data, a combination of word tokenization and one-hot encoding (for categorical data) was used, as detailed below.

For Maxmind GeoLite2 data, one-hot encoding is used to extract features from the city, subdivisions (e.g., state), postal code, country, registered country (the country in which the ISP has registered the network), continent, and time zone fields. To limit the number of features, cities, subdivisions, and postal codes with a frequency of less than 0.1% are ignored in all IPs in the data set. The latitude and longitude of each host is appended to the features, and one extra feature is extracted for each field indicating its existence.

From Maxmind GeoIP ISP data, extract tokens from the ISP, organization and AS organization fields from Maxmind. To extract tokens, use words of length two and higher with a frequency of at least 0.1% for IPs in the data set. The AS number is also appended to the features. An extra feature is extracted indicating the existence of each field. Table 4 shows the breakdown of features for each IP address. Overall, 9306 features are extracted, characterizing each host's location/AS information and scan data.

From this data, one can construct models for use with machine learning methods as seen in FIG. 3. A data set representing a plurality of network probes in a computer network serves as a starting point as indicated at 31. Each entry in the data set preferably includes an address for a port probed by a given network probe and an indicator of the response to the given network probe.

A geographic location for a port associated with each entry in the data set is then determined at 32. In one embodiment, the geographic location is retrieved from a database, such as Maxmind GeoLite2 database, using the address for a port. The geographic location may be expressed as city, postal code, country, continent, time zone or combinations thereof. Other techniques for determining geographic location for a port are also contemplated by this disclosure.

Likewise, ownership of a port associated with each entry in the data set is determined at 33. In one embodiment, ownership information is retrieved from a database, such as Maxmind GeoIP ISP2 database, using the address for a port. The ownership information may be defined as an identifier for an Internet service provider although other type of identifiers may be used as well. Other techniques for determining ownership of a port are also contemplated by this disclosure.

Next, a series of feature vectors are constructed from the data as indicated at 34. In one embodiment, each feature vector includes an address for a port in the computer network, a geographic location for the port and an indicator of the response given by the port to a network probe. In another embodiment, each feature vector includes an address for a port in the computer network, ownership of the port, and an indicator of the response given by the port to a network probe. In yet another embodiment, each feature vector includes an address for a port in the computer network, a geographic location for the port, ownership of the port, and an indicator of the response given by the port to a network probe.

Lastly, a model is trained at 35 with a machine learning method and using the series of feature vectors. In one example, the model is further defined as one or more decision trees and the machine learning method is further defined as a gradient-boosting method. The model preferably outputs a probability that a given port will respond to a request. Different implementations for the models as well as other machine learning methods also fall within the scope of this disclosure.

Before introducing machine learning enabled methods for intelligent scans, two simple baseline methods are evaluated for target selection and skipping over unresponsive regions of the Internet.

Many active hosts are also responsive to ICMP echo (ping) requests. Therefore, one can bootstrap scans by first pinging all public IPs, and then proceed to scan responsive hosts on the remaining probes. Additionally, one can also use a combination of popular probes by targeting the union of responsive hosts from multiple probes, in order to increase coverage when a portion of live IPs are unresponsive to ping requests.

Table 5 displays the performance achieved using the above method. Note that for full scans responsive IPs are recorded instead of active IPs; while responsive but inactive IPs are indicative of closed ports, it makes sense for the network scanner to probe other ports of such hosts to find open ports. Each column in Table 5 reports metrics from conducting exhaustive scans on the n most popular probes (with $n \in \{1, 5, 10, 10\}$), and performing the remaining probes on the observed responsive IPs. For example, $n=5$ means scanning based on full scans on ICMP, 53/DNS-query, 80/HTTP, 443/HTTPS, and 7547/CWMP. For each metric, its average and standard deviation are reported across the 9 snapshots. The overall (average) coverage over all probes (excluding the corresponding full scans for each column) is included, and the overall probing rate for conducting n full scans followed by 51-n partial scans. The coverage for a subset of probes with lower than average coverage is also reported.

As is evident from Table 5, this method cannot achieve consistent high coverage for all probes. Interestingly, using only ICMP echo scans receives less than 50% average coverage, suggesting that many active hosts do not respond to ping requests. Moreover, even with 20 full probes, less than 95% average coverage on the remaining scans, with discovery rates as low as ~80% on some probes. These results suggest that this target selection technique cannot provide reliable performance for all scans.

In addition to the previous target selection method, this disclosure assesses a second baseline method by skipping over inactive Internet subnets. Rather than selecting subnets by performing periodic full scans, this method selects targets using partial snapshots. To do this, first break the entire IPv4 space into blocks of length m, and then aggregate active IPs based on their corresponding subnet. Define $N_i$ to be the set of active IPs in block i, with $1 \le i \le 2^m$, and further assume that the blocks are sorted in descending order of their cardinality $|N_i|$. To meet a certain coverage level c while saving bandwidth, only scan the first $M_c$ blocks, where $$M_c = \min\left\{i : \frac{\sum_{j=1}^{n} |N_i|}{n} \ge c\right\},$$

where n is the number of active IPs. The corresponding probing rate is then $$\frac{M_c \times 2^{32-m}}{N},$$

where N is the number of announced IPs (~2.9 billion addresses). Table 6 includes the results when using /16 subnets. To minimize random sampling noise, choose m=16 to ensure the existence of at least 10 active IPs in all selected blocks. Coverage for a subset of probes is reported, as well as average coverage and probing rate across all 51 probes. Comparing with Table 5, more consistent results are obtained; however, one still observes coverages as low as 95% (for the NTP-monlist probe). Hence, this disclosure proposes an adaptive scanning method based on machine learning that can achieve much better probing rates, while guaranteeing the desired coverage across all probes.

In an example embodiment, Xgboost, a gradient-boosting method is used for training ensembles of decision trees. When dealing with tabular data, XGBoost models usually have superior performance compared to other ensemble methods, such as Random Forests and deep learning models. Moreover, gradient-boosted trees are much faster than neural networks, allowing one to minimize the computational overhead of the method and facilitate real-time prediction. Although gradient-boosting methods are preferred, these and other machine learning methods fall within the broader aspects of this disclosure.

In the example embodiment, the proposed scanning method uses models with 100 boosting rounds (trees), and the number of leaves in each tree is limited to 256. Further information regarding the Xgboost method is described by Tianqi Chen et. al., "Xgboost: A scalable tree boosting system" In Proceedings of the 22$^{nd}$ ACM Siggkdd International Conference of Knowledge Discovery and Data Mining (2016) which is incorporated by reference herein.

For illustration purposes, 80% of the samples are used from each snapshot to train models, and the remaining 20% are used to find thresholds achieving desired coverage levels and to estimate the resulting probing rates. Note that due to using partial snapshots, estimated coverage levels are subject to random sampling noise, especially for sparse probes. To counter the effects of random sampling, the desired coverage for each probe is adjusted as follows. Assume event $1\{\hat{y}_{i,k} \geq t_k\}$ to be a Bernoulli trial, with $\hat{y}_{i,k}$ and $t_k$ denoting the prediction (for host i) and threshold (for sending/suppressing probes) for probe k, respectively. One would like to find $t_k$ such that the resulting coverage level is at least c (e.g., for c=99%), using n samples of active IPs in our test set for the corresponding probe. Note, however, that simply choosing tk such that at least 99% of test samples are detected does not guarantee the desired coverage, especially when the number of trials is small. Instead, use the Wilson score interval to obtain a confidence interval for the coverage, given by:

$$\hat{c} = \frac{\hat{c} + \frac{z^2}{2n}}{1 + \frac{z^2}{n}} \pm \frac{z}{1 + \frac{z^2}{n}} \sqrt{\frac{\hat{c}(1-\hat{c})}{\hat{n}} + \frac{z^2}{4n^2}}, \quad (1)$$

where $\tilde{c}$ is the true coverage level, $\hat{c}$ is its approximation using n trials (test samples), and z is the $$1 - \frac{a}{2}$$

quantile of a standard Gaussian distribution according to an error rate α. Use a 95% confidence level, yielding α=0.05 and z≈1.96. Note that one can choose the Wilson score interval due to its robustness when the number of trials is small and/or with probabilities very close to one. In order to guarantee coverage of at least c, one should set the minimum value for $\tilde{c}$ in Equation 1 to c, yielding the adjusted coverage level $$\hat{c} = c + \sqrt{C(1-c)\frac{z^2}{n}}.$$

Then find the threshold $t_k$ to reach the adjusted coverage c^; this can be slightly higher than the target coverage for more popular ports (e.g., ICMP), or as high as 99.6% for sparse probes such as 123/NTP-monlist with n~1000 and c=99%.

Note that since the adjusted coverage guarantees a minimum desired TPR (with 95% confidence), the true coverage might be slightly higher than the desired one. This can introduce an increase of up to 3% in probing rates throughout the rest of the disclosure (see, Tables 7-9); however, it was found to increase the robustness of the method. One can reduce the effects of this correction on performance by increasing the size of the test set, increasing the portion of exhaustively probed IPs for training/evaluation, or removing the correction (e.g., when achieving an average coverage level is sufficient).

As proof of concept, start with using geolocation and ownership features from the Maxmind database. Note that using the proposed network scanning method one can predict the responses of all probes in parallel, as opposed to the diagram in FIG. 2. Table 7A shows the average and the standard deviation of probing rates at 90%, 95%, and 99% coverage levels across the nine (9) snapshots with models retrained for each snapshot. Probing rates are reported over all IPs, responsive IPs, active IPs, as well as individual probing rates for a subset of the scans; the full break-down of performances over all probes can be found in Table 11.

Reasonable performance was observed using this method, allowing the network scanner 8 to reach an average probing rate of 57.0%, while discovering 99% of active IPs. One can also observe particularly good performance for 53/DNS-query, 7547/CWMP (commonly used for routers), and 5672/AMQP (Advanced Message Queuing Protocol); this is possibly due to the correlation between these protocols and network types (i.e., residential, corporate, hosting, and so on), which can be inferred from the location and AS properties, particularly AS descriptions.

Comparing Table 7A with Tables 5 and 6, one observes better performance (e.g., 23.8% probing rate at 95% coverage compared to 39.5% in Table 5, and 57.0% probing rate at 99% coverage compared to 62.7% in Table 6). However, the true strength of the proposed scanning method is to guarantee the desired coverage levels. Thus, it has been shown that the proposed scanning method with a priori attributes can be used as a fast method for selecting scanning targets.

In addition to location and/or ownership information, cross-protocol dependencies can also be a significant asset when predicting liveness of hosts. This disclosure is a first attempt at utilizing these correlations for bootstrapping scans. To evaluate the extent at which a set of probes can help forecast liveness for a give probe, a set of classifiers are trained that take all available probe responses (excluding the one that is being predicted) as input. Note that this is a superset of the information that would be available to the scanner depicted in FIG. 2. A priori information is excluded for now, but the combination of both feature sets will be presented later.

Table 7B summarizes results (the full version can be found in Table 12 in the Appendix below), where one can observe significant predictive power over some probes. To list a few examples, observe <1% probing rate for most mail protocols (with the exception of SMTP services on port 25) even at 99% coverage, due to the strong correlation between mail servers installed on different ports. Also, observe similar behavior for VNC remote desktop servers. For MQTT services on port 8883 (a messaging protocol used, e.g., for communication between IoT devices) and VNC remote desktop servers on port 5902, one can achieve a very low probing rate for 90% and 95% coverage levels; however, at 99% one observes a significant increase in both the probing rate and variability across different snapshots. At this coverage level, models hit their limit for detecting live hosts, and need to significantly increase their probes in order to guarantee the desired TPR. The variability can also be explained by the random selection of test samples in each snapshot, where one snapshot may receive a slightly easier to predict test set resulting in a lower probing rate, while another receives a harder to forecast dataset resulting in a much higher probing rate (due to the model operating close to its upper bound for prediction). Due to this limitation, one has to choose a lower coverage level to attain more stability.

Furthermore, result are presented for models trained on the combination of location information, ownership information and probe response in Table 8. It is observed that training on all features allows one to leverage the strength of both features sets, substantially lowering the achieved proving rates. Comparing Tables 7A and 8, one observes a small reduction in probing rate of DNS queries, suggesting that cross-protocol dependencies are not strong predictors. However, a significant boost is attained for 5672/AMQP, and to a lesser extent for 7547/CWMP probes. It is also observed that the addition of location and ownership features helps stabilize and greatly improve performance for 8883/MQTT and 5902/VNC probes at 99% TPR in Table 7B. These observations suggest that the two feature sets are fairly orthogonal in their predictive power, allowing one to substantially improve performance using their combination. Note, however, that the results in Table 8 are a lower bound for the achievable probing rate using sequential scans depicted in FIG. 2, as some probes are inevitably conducted earlier than others, and one has to forgo some dependencies in cases where multiple probes are mutually correlated. This effect can be minimized by ranking probes according to their importance.

Probe responses can be a significant asset in prediction if one make use of previously conducted probes to enhance models for subsequent ones. However, these dependencies can vary significantly and are not necessarily symmetric. For instance, a popular port such as 80/HTTP can provide useful information for forecasting liveness of less popular probes, while the reverse does not usually hold. For this reason, this disclosure presents a heuristic approach to find an optimal order (of the probes) for scanning, based on feature importance obtained from trained XGBoost models. Intuitively, one would like to rank probes according to their net contributions, i.e., the performance gain provided to probes further down the sequence. This in turn minimizes the information loss due to dependencies between a probe and those scanned earlier. In one example, Shapley values can be used to quantify the contribution of each feature in a trained classifier, breaking down the score assigned to each arbitrary sample as $\emptyset_0 + \Sigma_{i=1}^M \emptyset_i$, where $\emptyset_i$ is the contribution from feature i, and $\emptyset_0$ is the expected output of the model over all samples. Shapley values are used due to their good properties such as local accuracy (attributions sum up to the output of the model), missingness (missing features are given no importance), and consistency (modifying a model so that a feature is given more weight never decreases its attribution). The contribution of a given probe, or a priori features, to a model's output is evaluated as the sum of contributions from all individual features, and the total contribution to the model is quantified as the mean absolute values of the contribution for individual samples. This allows one to construct an importance matrix W, where $w_{ij}$, i*j quantifies the importance of probe i for predicting the response of probe j. While reference is made to Shapley values, other techniques for quantifying contributions of feature in a classifier also fall within the scope of this disclosure.

To rank probes according to their net contribution, first train a set of classifiers using the same methodology as described above, i.e., using all probes except the one being examined for prediction. In one example, the TreeShap algorithm for evaluating feature attributions has a complexity of $O(TLD^2)$, where T is the number of trees, L the maximum number of leaves, and D the maximum depth of trees. To reduce the runtime of this algorithm, models are trained with 32 leaves and 50 boosting rounds, and evaluate attributions for 100K randomly selected samples from the test set. When using predicted values for bootstrapping scans, responsive but inactive IPs are often not recognized by the scanner due to suppression of probes for such hosts. Thus, the features of these IPs are masked during model training to mask their attribution.

Next, one needs to find a permutation (denoted by permutation matrix P), for which the sum of lower-triangular elements in $P^T W P$ is minimized, since those elements indicate contributions that are forfeited due to the selected order for scanning. However, finding the global optimum of this problem by exhaustively evaluating all permutations is infeasible. Instead, this disclosure proposes finding a local optimum using a simple hill climbing technique. In an example embodiment, start by ranking probes in descending order of their popularity according to Tables 1 and 2. Then evaluate all possible pairwise flips, and apply the most optimal one, i.e., the one resulting in the lowest j<i $W_{ij}$. Continue this step until no further optimization (i.e., pairwise flips) is possible. Other types of optimization techniques are contemplated by this disclosure.

In sum, an example technique for determining the order to scan the ports is as follows. A set of classifiers are first trained with training data, where the training data represents a plurality of network probes across a set of different types of ports and features in the set of classifiers include responses from the set of different types of ports. Contributions of each feature in the set of classifiers is then quantified, for example using Shapley values. Lastly, ports in the set of different types of ports are ordered to form a predefined sequence, where the ports are ordered according to importance of a given port for predicting response of another port. In one example, the ports are ordered using a hill climbing method although other optimization methods are contemplated as well.

Figure 4:
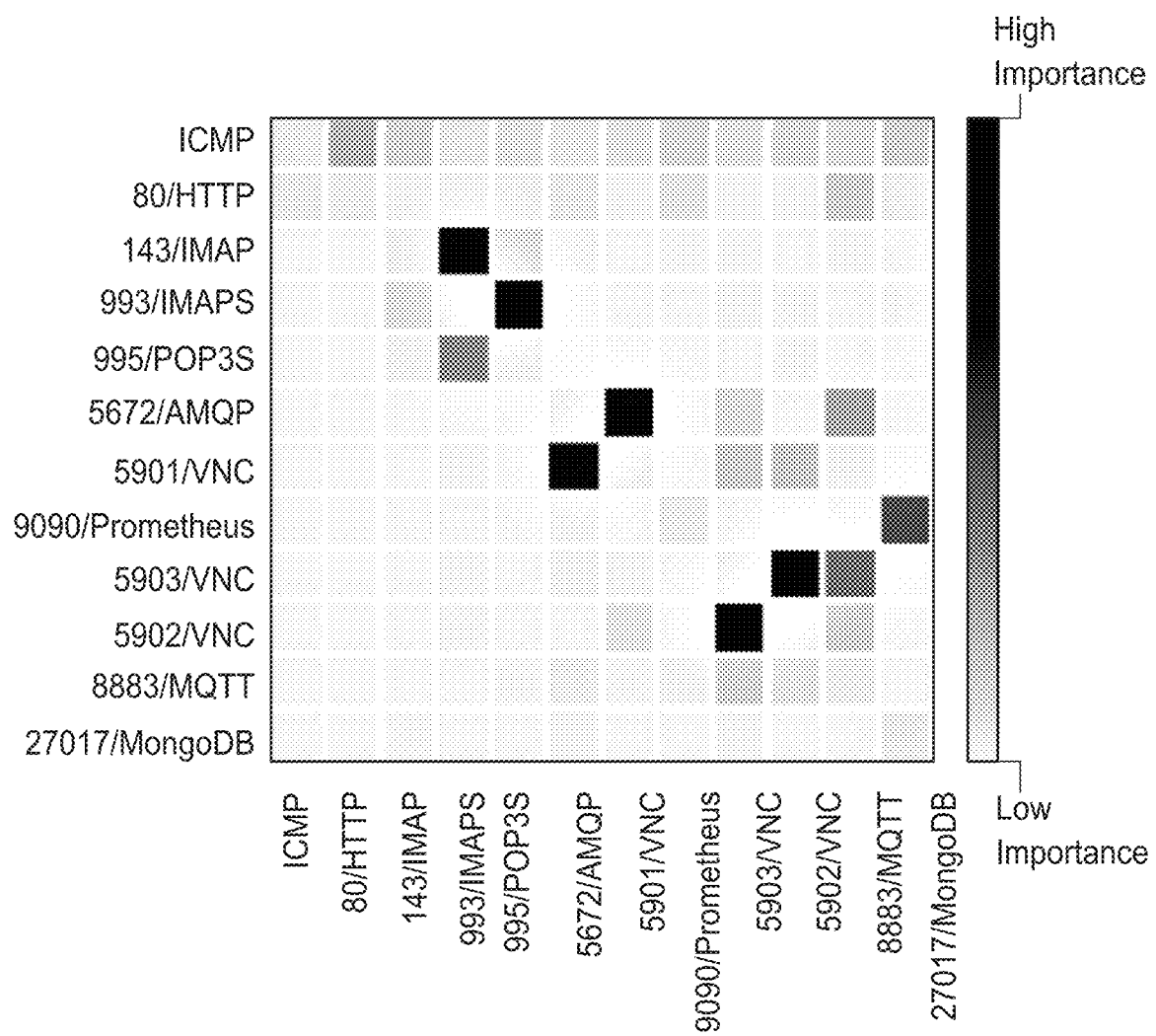
FIG. 4 is a matrix showing the importance of probes for predicting other probe responses.

FIG. 4 depicts the contributions between a selected subset of probes after ordering. Consistent contributions are observed from popular probes such as ICMP and 80/HTTP, which is why they are scanned first. High correlations are observed between mail (143/IMAP, 993/IMAPS, and 995/POP3S) and remote desktop (5901-5903/VNC) protocols.

Interestingly, high dependencies are also observed between certain sets, e.g., (8883/MQTT, 5901-5903/VNC, 5672/AMQP) and (9090/Prometheus, 27017/MongoDB). Looking at the pattern by which active protocol appear together, one observes that for all highly correlated pairs, for 60-85% of instances where either one the two protocols is active, both are jointly active. Note that as mentioned before, contributions are not necessarily symmetric, e.g., 8883/MQTT is more dependent on 5672/AMQP and 5902-5903/VNC than vice versa, and is therefore placed toward the end. Nevertheless, it is inevitable forgoing some high importance pairs, e.g., the dependence of 5903/VNC on 5902/VNC, and 5672/AMQP on 5901/VNC, which leads to higher probing rates for sequential scans compared to Table 8.

Next, the results obtained from sequential intelligent scans are discussed. To train models for this purpose, XGBoost classifiers were used with 32 leaves for each tree, and 50 boosting rounds. These parameters are lower than those used in the experiments described above in order to reduce the prediction time of models for scalable analysis.

Models in this section are performing predictions on a subset of available information. In addition to hidden probe responses due to the selected order for scanning, this includes responses of suppressed probes for both responsive but inactive IPs and active IPs that go undetected (the percentage of the latter is determined by the selected coverage level). Therefore, the features of these IPs are masked for both training and testing data sets; this choice means that one has to train a different set of models for each coverage level.

Table 9 displays the performance of the proposed scanning method using the scan order shown in FIG. 4. An overall probing rate of 18.5% is achieved, while discovering 99% of active IPs across all probes, effectively performing 51 scans at the cost of 9.5. For active hosts, this reduces the traffic sent to each host to 16.2 probes on average.

Comparing sequential probes (Table 9) to predictions using only a priori features (Table 7a), one can see that probing rates of the sequential method are lower (with the exception of ICMP which is slightly higher due to it being the very first scan, and the lower complexity of models in Table 9), with 41 probes achieving >20% lower probing rates at 99% TPR. It is also worth mentioning that less popular probes have larger rooms for probing rate reduction, and the proposed method makes good use of this fact. At 90%, 95%, and 99% coverage levels, respectively, 36, 30, and 15 of the probing rates for sequential scans are within 2% of popularities in Tables 1 and 2.

Comparing with predictions using only probe responses (Table 7b), one also observes better overall performance due to the addition of location/ownership properties. However, performance over responsive/active IPs is slightly better in Table 7b. This is due to the fact that for unresponsive IPs, probe responses do not provide any information, while sequential scans can make use of location/AS properties to boost prediction. On the other hand, responsive hosts provide signals for prediction in Table 7b, and full information for these models allows them to achieve slightly better performance over responsive/active IPs compared to Table 9. Comparing individual probes at the 99% coverage level, all but one of the probing rates for the sequential method are within 2.5% or lower (with 161/SNMPv2 being 11.8% higher), while 34 probes achieve >20% lower probing rates for the sequential method. Note that this is despite the fact that we are performing predictions using a subset of probe responses; evidently a priori features help make up for the absence of this information. Moreover, observe that a priori features help stabilize predictions of many probes including 8883/MQTT and 5902/VNC at 99% coverage. One continues to observe some variability for 123/NTP-monlist, and to a lesser extent for 1900/UPnP, 161/SNMPv1, and 161/SNMPv2 (these are also the most sparse probes among our scans); one needs to switch to the 95% coverage level to increase stability for these probes. Increasing the size of the train/test data sets could help stabilize these cases by curating more samples, reducing the effects of adjusted coverage levels.

Note that the probing rates in Table 9 are higher than those in Table 8. This is to be expected, as predictions are performed for a subset of all available information: in addition to missing information for probes earlier in the sequence, we are also missing information from suppressed probes, i.e., undetected active hosts and responsive but inactive hosts. Nevertheless, for 26/51 probes at 99% coverage, the obtained probing rates are within 2.5% of the lower bounds obtained from prediction using full information.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

TABLE 1

Ports, (commonly used) protocols, and popularities (percentage of active hosts) of TCP probes.

| 80 | 443 | 7547 | 22 | 21 | 25 | 8080 | 3306 |
|---|---|---|---|---|---|---|---|
| HTTP | HTTPS | CWMP | SSH | FTP | SMTP | HTTP | MySQL |
| 2.25% | 1.87% | 1.42% | 0.89% | 0.55% | 0.46% | 0.43% | 0.32% |
| 465 | 23 | 8888 | 5432 | 1883 | 8883 | 5672 | 5901 |
| SMTP | Telnet | HTTP | Postgres | MQTT | MQTT | AMQP | VNC |
| 0.27% | 0.24% | 0.23% | 0.20% | 0.19% | 0.19% | 0.19% | 0.19% |
| 5900 | 6443 | 1433 | 631 | 16993 | 1911 | 47808 | 2323 |
| VNC | Kubernetes | MSSQL | IPP | HTTPS | Fox | BACnet | Telnet |
| 0.15% | 0.15% | 0.14% | 0.14% | 0.13% | 0.13% | 0.13% | 0.13% |

| | 110 | 143 | 3389 | 587 | 993 | 995 |
|---|---|---|---|---|---|---|
| | POP3 | IMAP | RDP | SMTP | IMAPS | POP3S |
| | 0.31% | 0.30% | 0.30% | 0.29% | 0.28% | 0.28% |
| | 1521 | 5902 | 5903 | 9090 | 9200 | 6379 |
| | Oracle | VNC | VNC | Prometheus | Elasticsearch | Redis |
| | 0.17% | 0.17% | 0.17% | 0.16% | 0.16% | 0.15% |
| | 16992 | 27017 | 445 | 502 | 11211 | 102 |
| | HTTP | MongoDB | SMB | Modbus | Memcached | S7 |
| | 0.13% | 0.13% | 0.13% | 0.12% | 0.12% | 0.12% |

TABLE 2

Ports, protocols, and popularities of ICM/UDP probes.

| N/A | 53 | 161 | 123 | 53 | 161 | 161 | 1900 | 123 |
|---|---|---|---|---|---|---|---|---|
| ICMP | DNS-query | SNMPv3 | NTP | DNS-version | SNMPv1 | SNMPv2 | UPnP | NTP-monlist |
| 13.02% | 8.22% | 1.24% | 0.30% | 0.28% | 0.08% | 0.07% | 0.03% | 0.02% |

TABLE 3

Number of responsive/active hosts, and the average Number of responsive/active probes from scans performed on 25 million randomly selected IPs from the public IPv4 space.

| | Responsive IPs | | Active IPs | |
|---|---|---|---|---|
| Date | Total (million) | Responsive probes | Total (million) | Active probes |
| 2020 Apr. 4 | 4.96 | 9.0 | 4.18 | 1.7 |
| 2020 Apr. 11 | 5.03 | 8.8 | 4.27 | 1.7 |
| 2020 Apr. 18 | 4.96 | 9.0 | 4.18 | 1.7 |
| 2020 Apr. 25 | 5.19 | 8.6 | 4.43 | 1.7 |
| 2020 May 2 | 4.99 | 9.0 | 4.22 | 1.7 |
| 2020 May 9 | 5.02 | 8.8 | 4.27 | 1.7 |
| 2020 May 16 | 5.00 | 8.9 | 4.24 | 1.7 |
| 2020 May 23 | 4.99 | 9.0 | 4.23 | 1.7 |
| 2020 May 30 | 5.01 | 8.9 | 4.24 | 1.7 |
| Average | 5.02 | 8.9 | 4.25 | 1.7 |

TABLE 4

Number of features extracted from raw data, resulting in 9306 total features for each IP address.

| Data type | Field | # of features |
|---|---|---|
| Geolocation | City | 556 |
| | Subdivisions | 4038 |
| | Postal code | 207 |
| | Country | 251 |
| | Registered country | 237 |
| | Continent | 8 |
| | Time zone | 402 |
| | Latitude/longitude | 4 |
| | Total | 5703 |
| Ownership | ISP | 1095 |
| | Organization | 1111 |
| | AS organization | 1086 |
| | AS number | 2 |
| | Total | 3294 |
| TCP probe | IP ID | 1 |
| | TTL | 1 |
| | Windows size | 1 |
| | Classification | 2 |
| | Total | 5 |
| UDP probe | IP ID | 1 |
| | TTL | 1 |
| | Classification | 2 |
| | UDP packet size | 1 |
| | ICMP code | 7 |
| | Total | 12 |
| ICMP probe | IP ID | 1 |
| | TTL | 1 |
| | Classification | 1 |
| | Total | 3 |

TABLE 5

Coverage and probing rate when discovering active IPs using results of multiple exhaustive scans. We report the coverage for select probes, as well as coverage and probing rate over all scans, excluding the corresponding full probes for each column for computing the overall coverage.

| | Number of full scans | | | |
|---|---|---|---|---|
| Probe | 1 | 2 | 3 | 4 |
| 5432/Postgres | 29.0 ± 1.3 | 77.4 ± 2.0 | 79.3 ± 1.9 | 79.6 ± 1.9 |
| 8883/MQTT | 23.3 ± 2.1 | 78.5 ± 2.6 | 79.9 ± 2.6 | 80.1 ± 2.6 |
| 5672/AMQP | 23.2 ± 1.7 | 78.9 ± 2.4 | 80.0 ± 2.3 | 80.2 ± 2.4 |
| 1521/Oracle | 15.2 ± 2.2 | 74.6 ± 2.6 | 75.8 ± 2.6 | 76.1 ± 2.7 |
| 5903/VNC | 17.2 ± 2.1 | 77.3 ± 2.5 | 78.4 ± 2.6 | 78.6 ± 2.6 |
| Coverage | 42.6 ± 1.3 | 91.5 ± 0.6 | 94.4 ± 0.4 | 93.6 ± 0.6 |
| Probe rate | 14.7 ± 0.1 | 30.5 ± 0.3 | 39.5 ± 0.3 | 54.6 ± 0.2 |

TABLE 6

Performance of probing based on block selection, using the most responsive/16 subnets to achieve the desired coverage.

| | Coverage | | |
|---|---|---|---|
| Probe | 90% | 95% | 99% |
| 443/HTTPS | 75.7 ± 0.3 | 87.0 ± 0.2 | 97.1 ± 0.0 |
| 53/DNS-version | 76.5 ± 0.6 | 89.0 ± 0.3 | 98.1 ± 0.1 |
| 23/Telnet | 74.7 ± 0.4 | 87.3 ± 0.4 | 97.6 ± 0.0 |
| 161/SNMPv1 | 67.3 ± 1.2 | 83.5 ± 0.9 | 96.3 ± 0.3 |
| 123/NTP-monlist | 66.1 ± 1.1 | 81.2 ± 0.7 | 95.2 ± 0.2 |
| Probe rate | 39.9 ± 0.3 | 48.4 ± 0.2 | 62.7 ± 0.1 |

TABLE 7

Performance of models trained on location/AS features and probe responses. We report performance over a subset of our probes, and overall (average) probing rates over all, responsive, and active IPs. We observe that machine learning models achieve better performance and are more robust compared to baseline methods. We also obtain very low probing rates for some probes in Table 7b, suggesting strong cross-protocol correlations.

| (a) Location/AS features | | | | (b) Probe responses | | | |
|---|---|---|---|---|---|---|---|
| | Guaranteed coverage | | | | Guaranteed coverage | | |
| Probe | 90% | 95% | 99% | Probe | 90% | 95% | 99% |
| 53/DNS-query | 9.0 ± 0.1% | 10.0 ± 0.0% | 15.8 ± 0.6% | 995/POP3S | 0.3 ± 0.0% | 0.3 ± 0.0% | 0.3 ± 0.0% |
| 7547/CWMP | 7.7 ± 0.1% | 11.4 ± 0.3% | 31.1 ± 0.7% | 8883/MQTT | 0.2 ± 0.0% | 0.4 ± 0.1% | 59.7 ± 30.8% |
| 5672/AMQP | 2.4 ± 0.3% | 9.4 ± 1.2% | 44.6 ± 3.7% | 5902/VNC | 0.2 ± 0.0% | 0.2 ± 0.0% | 25.2 ± 35.2% |
| Total | 13.1 ± 0.4% | 23.8 ± 0.6% | 57.0 ± 1.4% | Total | 11.9 ± 1.0% | 19.6 ± 0.6% | 52.9 ± 3.1% |
| Responsive | 19.5 ± 0.6% | 36.1 ± 0.6% | 71.2 ± 1.0% | Responsive | 9.1 ± 0.3% | 12.9 ± 0.3% | 26.2 ± 0.6% |
| Active | 20.0 ± 0.6% | 37.5 ± 0.7% | 72.4 ± 0.9% | Active | 10.0 ± 0.3% | 13.9 ± 0.3% | 27.9 ± 0.6% |

TABLE 8

Performance of models trained on all features (location/AS and probe responses). Models achieve a significant boost in performance/stability compared to Tables 7a and 7b.

| | Guaranteed coverage | | |
|---|---|---|---|
| Probe | 90% | 95% | 99% |
| 53/DNS-query | 8.8 ± 0.1% | 9.6 ± 0.1% | 10.7 ± 0.0% |
| 7547/CWMP | 3.3 ± 0.1% | 5.2 ± 0.1% | 12.4 ± 0.4% |
| 995/POP3S | 0.3 ± 0.0% | 0.3 ± 0.0% | 0.3 ± 0.0% |
| 8883/MQTT | 0.2 ± 0.0% | 0.2 ± 0.0% | 1.0 ± 0.2% |
| 5672/AMQP | 0.2 ± 0.0% | 0.2 ± 0.0% | 1.2 ± 0.3% |
| 5902/VNC | 0.2 ± 0.0% | 0.2 ± 0.0% | 0.3 ± 0.1% |
| Total | 1.4 ± 0.0% | 2.5 ± 0.0% | 9.9 ± 0.3% |
| Responsive | 4.3 ± 0.1% | 6.5 ± 0.1% | 18.9 ± 0.5% |
| Active | 4.8 ± 0.1% | 7.2 ± 0.1% | 20.0 ± 0.5% |

TABLE 9

Performance of sequential intelligent scans.

| | Guaranteed coverage | | |
|---|---|---|---|
| Probe | 90% | 95% | 99% |
| 53/DNS-query | 9.0 ± 0.1% | 10.1 ± 0.0% | 11.7 ± 0.1% |
| 7547/CWMP | 4.5 ± 0.1% | 7.2 ± 0.3% | 19.4 ± 0.8% |
| 995/POP3S | 0.3 ± 0.0% | 0.3 ± 0.0% | 0.8 ± 0.3% |
| 8883/MQTT | 0.2 ± 0.0% | 0.3 ± 0.1% | 2.4 ± 1.0% |
| 5672/AMQP | 0.3 ± 0.1% | 0.4 ± 0.2% | 3.4 ± 0.3% |
| 5902/VNC | 0.2 ± 0.0% | 0.2 ± 0.0% | 0.6 ± 0.2% |
| Total | 4.2 ± 0.1% | 6.7 ± 0.1% | 18.5 ± 0.7% |
| Responsive | 9.3 ± 0.2% | 13.6 ± 0.4% | 30.3 ± 0.9% |
| Active | 10.1 ± 0.2% | 14.5 ± 0.4% | 31.7 ± 0.9% |

TABLE 10

Suggested bandwidth, probing rate, and prediction time (summed over all probes) for different model complexities.

| Suggested bandwidth | Leaves | Boosting rounds | Probing rate | Prediction time |
|---|---|---|---|---|
| 100 Mbps | 256 | 100 | 16.9 ± 0.5% | 170 μs |
| 1 Gbps | 32 | 50 | 18.5 ± 0.7% | 20 μs |
| 10 Gbps | 8 | 10 | 25.1 ± 1.3% | 2.9 μs |

TABLE 11

Performance of models trained on location/AS features (Table 7a).

| | Guaranteed coverage | | |
|---|---|---|---|
| Probe | 90% | 95% | 99% |
| ICMP | 38.2 ± 0.1% | 48.2 ± 0.1% | 67.8 ± 0.3% |
| 53/DNS-query | 9.0 ± 0.1% | 10.0 ± 0.0% | 15.8 ± 0.6% |
| 80/HTTP | 29.9 ± 0.4% | 44.5 ± 0.4% | 69.0 ± 0.9% |
| 443/HTTPS | 30.1 ± 0.2% | 44.4 ± 0.4% | 69.3 ± 0.4% |
| 7547/CWMP | 7.7 ± 0.1% | 11.4 ± 0.3% | 31.1 ± 0.7% |
| 161/SNMPv3 | 26.9 ± 0.3% | 39.8 ± 0.3% | 61.8 ± 0.8% |
| 22/SSH | 25.1 ± 0.5% | 40.5 ± 0.6% | 65.8 ± 1.0% |
| 21/FTP | 25.9 ± 0.5% | 38.9 ± 0.7% | 64.3 ± 0.9% |
| 25/SMTP | 15.3 ± 0.5% | 29.2 ± 0.7% | 60.2 ± 0.9% |
| 8080/HTTP | 31.7 ± 0.7% | 44.8 ± 0.6% | 67.1 ± 0.9% |
| 3306/MySQL | 8.6 ± 0.5% | 19.2 ± 1.0% | 51.6 ± 1.7% |
| 110/POP3 | 9.9 ± 0.6% | 22.6 ± 0.9% | 55.7 ± 1.4% |
| 143/IMAP | 10.3 ± 0.6% | 22.5 ± 1.1% | 56.1 ± 2.5% |
| 3389/RDP | 22.8 ± 0.7% | 37.8 ± 1.1% | 63.9 ± 1.1% |
| 123/NTP | 39.5 ± 0.5% | 52.0 ± 0.6% | 73.0 ± 1.2% |
| 587/SMTP | 9.5 ± 0.6% | 22.6 ± 1.2% | 55.4 ± 1.3% |
| 53/DNS-version | 24.7 ± 0.8% | 38.4 ± 0.8% | 65.2 ± 1.2% |

TABLE 11-continued

Performance of models trained on location/AS features (Table 7a).

| | Guaranteed coverage | | |
|---|---|---|---|
| Probe | 90% | 95% | 99% |
| 993/IMAPS | 8.4 ± 0.5% | 21.2 ± 0.8% | 54.8 ± 1.8% |
| 995/POP3S | 7.5 ± 0.4% | 18.4 ± 0.7% | 52.3 ± 2.7% |
| 465/SMTP | 9.5 ± 0.6% | 21.8 ± 0.9% | 55.6 ± 2.2% |
| 8888/HTTP | 13.5 ± 1.0% | 27.1 ± 0.9% | 60.9 ± 1.3% |
| 23/Telnet | 30.2 ± 0.6% | 42.0 ± 0.6% | 67.0 ± 2.0% |
| 5432/Postgres | 4.4 ± 0.4% | 14.1 ± 1.6% | 51.7 ± 2.4% |
| 1883/MQTT | 3.5 ± 0.5% | 12.2 ± 1.5% | 50.6 ± 3.8% |
| 8883/MQTT | 3.5 ± 0.6% | 14.2 ± 1.3% | 55.0 ± 2.9% |
| 5672/AMQP | 2.4 ± 0.3% | 9.4 ± 1.2% | 44.6 ± 3.7% |
| 5901/VNC | 2.5 ± 0.4% | 10.9 ± 1.1% | 53.0 ± 4.2% |
| 1521/Oracle | 2.2 ± 0.4% | 10.3 ± 1.2% | 48.6 ± 3.2% |
| 5902/VNC | 1.9 ± 0.2% | 8.7 ± 1.0% | 49.7 ± 3.8% |
| 5903/VNC | 1.8 ± 0.3% | 7.9 ± 1.2% | 48.4 ± 3.6% |
| 9090/Prometheus | 10.6 ± 1.9% | 25.0 ± 1.9% | 61.9 ± 2.9% |
| 9200/Elasticsearch | 3.0 ± 0.4% | 10.7 ± 1.1% | 49.9 ± 3.3% |
| 6379/Redis | 2.9 ± 0.5% | 9.7 ± 1.2% | 46.5 ± 2.2% |
| 5900/VNC | 11.4 ± 1.6% | 29.6 ± 2.9% | 67.7 ± 2.5% |
| 6443/Kubernetes | 4.4 ± 0.7% | 13.4 ± 1.3% | 54.1 ± 2.8% |
| 1433/MSSQL | 10.9 ± 1.5% | 24.2 ± 1.8% | 59.3 ± 2.4% |
| 631/IPP | 5.0 ± 0.9% | 16.4 ± 1.5% | 63.7 ± 3.6% |
| 16993/HTTPS | 2.1 ± 0.4% | 9.0 ± 0.9% | 49.3 ± 4.2% |
| 1911/Fox | 2.5 ± 0.5% | 10.0 ± 1.3% | 55.7 ± 4.5% |
| 47808/BACnet | 2.1 ± 0.4% | 8.6 ± 1.1% | 50.6 ± 4.5% |
| 2323/Telnet | 5.9 ± 1.1% | 15.6 ± 1.7% | 57.0 ± 2.2% |
| 16992/HTTP | 2.4 ± 0.4% | 9.3 ± 1.0% | 51.7 ± 3.8% |
| 27017/MongoDB | 4.3 ± 0.9% | 12.4 ± 0.8% | 54.6 ± 3.2% |
| 502/Modbus | 3.2 ± 0.7% | 12.1 ± 1.4% | 56.6 ± 2.9% |
| 445/SMB | 17.0 ± 1.1% | 30.0 ± 1.0% | 57.6 ± 1.9% |
| 11211/Memcached | 2.8 ± 0.5% | 10.9 ± 1.5% | 51.7 ± 4.7% |
| 102/S7 | 2.6 ± 0.6% | 10.0 ± 0.8% | 54.1 ± 3.7% |
| 161/SNMPv1 | 30.7 ± 1.3% | 46.1 ± 1.9% | 73.5 ± 3.2% |
| 161/SNMPv2 | 31.1 ± 1.4% | 45.6 ± 1.7% | 72.8 ± 2.0% |
| 1900/UPnP | 11.2 ± 0.9% | 17.0 ± 2.4% | 45.5 ± 10.1% |
| 123/NTP-monlist | 47.3 ± 1.4% | 64.1 ± 1.5% | 87.9 ± 5.2% |
| Total | 13.1 ± 0.4% | 23.8 ± 0.6% | 57.0 ± 1.4% |
| Responsive | 19.5 ± 0.6% | 36.1 ± 0.6% | 71.2 ± 1.0% |
| Active | 20.0 ± 0.6% | 37.5 ± 0.7% | 72.4 ± 0.9% |

TABLE 12

Performace of models trained on probe responses (Table 7b).

| | Guaranteed coverage | | |
|---|---|---|---|
| Probe | 90% | 95% | 99% |
| ICMP | 95.4 ± 1.2% | 95.4 ± 1.2% | 96.7 ± 0.6% |
| 53/DNS-query | 84.6 ± 0.2% | 84.6 ± 0.2% | 84.7 ± 0.2% |
| 80/HTTP | 4.1 ± 0.1% | 12.6 ± 0.3% | 90.7 ± 0.7% |
| 443/HTTPS | 86.8 ± 0.4% | 86.8 ± 0.4% | 86.8 ± 0.4% |
| 7547/CWMP | 84.0 ± 0.4% | 84.0 ± 0.4% | 84.1 ± 0.5% |
| 161/SNMPv3 | 82.1 ± 0.4% | 82.1 ± 0.4% | 82.1 ± 0.4% |
| 22/SSH | 4.8 ± 0.6% | 87.6 ± 0.5% | 87.6 ± 0.5% |
| 21/FTP | 1.8 ± 0.2% | 4.0 ± 0.4% | 90.1 ± 0.9% |
| 25/SMTP | 36.5 ± 38.4% | 80.3 ± 1.0% | 80.3 ± 1.0% |
| 8080/HTTP | 9.8 ± 0.3% | 90.3 ± 0.4% | 90.3 ± 0.4% |
| 3306/MySQL | 0.8 ± 0.0% | 1.5 ± 0.1% | 82.5 ± 1.4% |
| 110/POP3 | 0.3 ± 0.0% | 0.3 ± 0.0% | 0.5 ± 0.0% |
| 143/IMAP | 0.3 ± 0.0% | 0.3 ± 0.0% | 0.5 ± 0.0% |
| 3389/RDP | 87.7 ± 0.7% | 87.7 ± 0.7% | 91.3 ± 0.4% |
| 123/NTP | 1.1 ± 0.0% | 2.5 ± 0.2% | 92.9 ± 0.1% |
| 587/SMTP | 0.3 ± 0.0% | 0.3 ± 0.0% | 0.4 ± 0.0% |
| 53/DNS-version | 3.1 ± 1.1% | 6.2 ± 1.9% | 84.6 ± 0.6% |
| 993/IMAPS | 0.3 ± 0.0% | 0.3 ± 0.0% | 0.4 ± 0.0% |
| 995/POP3S | 0.3 ± 0.0% | 0.3 ± 0.0% | 0.3 ± 0.0% |
| 465/SMTP | 0.3 ± 0.0% | 0.3 ± 0.0% | 0.4 ± 0.0% |
| 8888/HTTP | 1.2 ± 0.1% | 3.7 ± 0.3% | 95.2 ± 0.3% |
| 23/Telnet | 1.3 ± 0.1% | 3.1 ± 0.2% | 94.9 ± 0.2% |
| 5432/Postgres | 0.2 ± 0.1% | 8.9 ± 23.7 | 77.0 ± 0.7% |
| 1883/MQTT | 0.2 ± 0.0% | 0.2 ± 0.0% | 10.5 ± 23.3% |
| 8883/MQTT | 0.2 ± 0.0% | 0.4 ± 0.1% | 59.7 ± 30.8% |

TABLE 12-continued

Performance of models trained on probe responses (Table 7b).

| Probe | Guaranteed coverage | | |
|---|---|---|---|
| | 90% | 95% | 99% |
| 5672/AMQP | 0.2 ± 0.0% | 0.2 ± 0.0% | 18.3 ± 30.9% |
| 5901/VNC | 0.2 ± 0.0% | 0.2 ± 0.0% | 52.2 ± 34.6% |
| 1521/Oracle | 0.2 ± 0.0% | 8.5 ± 23.2% | 75.2 ± 0.5% |
| 5902/VNC | 0.2 ± 0.0% | 0.2 ± 0.0% | 25.2 ± 35.2% |
| 5903/VNC | 0.2 ± 0.0% | 0.2 ± 0.0% | 0.2 ± 0.0% |
| 9090/Prometheus | 0.4 ± 0.1% | 4.9 ± 1.2% | 85.0 ± 0.9% |
| 9200/Elasticsearch | 0.2 ± 0.0% | 0.2 ± 0.0% | 28.4 ± 35.4% |
| 6379/Redis | 0.2 ± 0.0% | 0.2 ± 0.0% | 61.0 ± 31.7% |
| 5900/VNC | 0.2 ± 0.0% | 0.6 ± 0.2% | 83.1 ± 1.1% |
| 6443/Kubernetes | 0.2 ± 0.0% | 0.2 ± 0.0% | 78.1 ± 0.9% |
| 1433/MSSQL | 0.2 ± 0.0% | 0.6 ± 0.1% | 84.5 ± 1.2% |
| 631/IPP | 0.1 ± 0.0% | 0.2 ± 0.0% | 2.5 ± 0.9% |
| 16993/HTTPS | 0.1 ± 0.0% | 0.1 ± 0.0% | 0.2 ± 0.0% |
| 1911/Fox | 0.1 ± 0.0% | 0.1 ± 0.0% | 8.9 ± 23.5% |
| 47808/BACnet | 0.1 ± 0.0% | 0.1 ± 0.0% | 0.2 ± 0.1% |
| 2323/Telnet | 0.1 ± 0.0% | 0.2 ± 0.0% | 73.8 ± 23.3% |
| 16992/HTTP | 0.1 ± 0.0% | 0.1 ± 0.0% | 8.7 ± 23.5% |
| 27017/MongoDB | 0.1 ± 0.0% | 0.2 ± 0.0% | 37.8 ± 37.0% |
| 502/Modbus | 0.1 ± 0.0% | 0.1 ± 0.0% | 52.1 ± 35.3% |
| 445/SMB | 0.5 ± 0.0% | 1.2 ± 0.1% | 81.2 ± 0.7% |
| 11211/Memcached | 0.1 ± 0.0% | 0.2 ± 0.0% | 43.3 ± 37.4% |
| 102/S7 | 0.1 ± 0.0% | 0.1 ± 0.0% | 8.9 ± 23.7% |
| 161/SNMPv1 | 0.1 ± 0.0% | 75.0 ± 0.3% | 76.9 ± 0.8% |
| 161/SNMPv2 | 0.1 ± 0.0% | 0.1 ± 0.0% | 10.9 ± 23.5% |
| 1900/UPnP | 14.4 ± 24.0% | 82.9 ± 0.4% | 91.3 ± 0.9% |
| 123/NTP-monlist | 0.1 ± 0.0% | 0.3 ± 0.1% | 47.4 ± 37.3% |
| Total | 11.9 ± 1.0% | 19.6 ± 0.6% | 52.9 ± 3.1% |
| Responsive | 9.1 ± 0.3% | 12.9 ± 0.3% | 26.2 ± 0.6% |
| Active | 10.0 ± 0.3% | 13.9 ± 0.3% | 27.9 ± 0.6% |

TABLE 13

Performance of models trained on location/AS features and probe repsonses (Table 8).

| Probe | Guaranteed coverage | | |
|---|---|---|---|
| | 90% | 95% | 99% |
| ICMP | 22.8 ± 0.1% | 32.7 ± 0.3% | 55.3 ± 0.2% |
| 53/DNS-query | 8.8 ± 0.1% | 9.6 ± 0.1% | 10.7 ± 0.0% |
| 80/HTTP | 3.2 ± 0.0% | 6.0 ± 0.1% | 31.3 ± 0.7% |
| 443/HTTPS | 4.6 ± 0.1% | 8.9 ± 0.1% | 35.3 ± 0.8% |
| 7547/CWMP | 3.3 ± 0.1% | 5.2 ± 0.1% | 12.4 ± 0.4% |
| 161/SNMPv3 | 5.6 ± 0.1% | 11.5 ± 0.2% | 33.8 ± 0.7% |
| 22/SSH | 2.6 ± 0.1% | 4.6 ± 0.1% | 16.0 ± 1.3% |
| 21/FTP | 1.5 ± 0.0% | 2.7 ± 0.0% | 19.8 ± 1.4% |
| 25/SMTP | 0.6 ± 0.0% | 1.0 ± 0.0% | 12.6 ± 2.2% |
| 8080/HTTP | 5.0 ± 0.2% | 13.2 ± 0.6% | 36.9 ± 1.2% |
| 3306/MySQL | 0.8 ± 0.0% | 1.3 ± 0.1% | 4.8 ± 0.5% |
| 110/POP3 | 0.3 ± 0.0% | 0.3 ± 0.0% | 0.5 ± 0.0% |
| 143/IMAP | 0.3 ± 0.0% | 0.3 ± 0.0% | 0.4 ± 0.0% |
| 3389/RDP | 3.0 ± 0.2% | 10.2 ± 1.1% | 45.1 ± 1.7% |
| 123/NTP | 0.9 ± 0.0% | 1.8 ± 0.1% | 17.4 ± 1.1% |
| 587/SMTP | 0.3 ± 0.0% | 0.3 ± 0.0% | 0.4 ± 0.0% |
| 53/DNS-version | 0.3 ± 0.0% | 0.6 ± 0.1% | 6.6 ± 1.0% |
| 993/IMAPS | 0.3 ± 0.0% | 0.3 ± 0.0% | 0.4 ± 0.0% |
| 995/POP3S | 0.3 ± 0.0% | 0.3 ± 0.0% | 0.3 ± 0.0% |
| 465/SMTP | 0.3 ± 0.0% | 0.3 ± 0.0% | 0.4 ± 0.0% |
| 8888/HTTP | 0.9 ± 0.1% | 2.4 ± 0.2% | 20.6 ± 1.4% |
| 23/Telnet | 1.0 ± 0.0% | 2.0 ± 0.1% | 12.0 ± 0.9% |
| 5432/Postgres | 0.2 ± 0.0% | 0.5 ± 0.1% | 3.7 ± 0.4% |
| 1883/MQTT | 0.2 ± 0.0% | 0.2 ± 0.0% | 1.3 ± 0.3% |
| 8883/MQTT | 0.2 ± 0.0% | 0.2 ± 0.0% | 1.0 ± 0.2% |
| 5672/AMQP | 0.2 ± 0.0% | 0.2 ± 0.0% | 1.2 ± 0.3% |
| 5901/VNC | 0.2 ± 0.0% | 0.2 ± 0.0% | 1.2 ± 0.2% |
| 1521/Oracle | 0.2 ± 0.0% | 0.2 ± 0.0% | 3.3 ± 0.6% |
| 5902/VNC | 0.2 ± 0.0% | 0.2 ± 0.0% | 0.3 ± 0.1% |
| 5903/VNC | 0.2 ± 0.0% | 0.2 ± 0.0% | 0.2 ± 0.0% |
| 9090/Prometheus | 0.3 ± 0.0% | 1.4 ± 0.2% | 17.1 ± 3.6% |
| 9200/Elasticsearch | 0.2 ± 0.0% | 0.2 ± 0.0% | 2.0 ± 0.3% |

TABLE 13-continued

Performace of models trained on location/AS features and probe repsonses (Table 8).

| Probe | Guaranteed coverage | | |
|---|---|---|---|
| | 90% | 95% | 99% |
| 6379/Redis | 0.2 ± 0.0% | 0.2 ± 0.0% | 1.3 ± 0.3% |
| 5900/VNC | 0.2 ± 0.0% | 0.5 ± 0.1% | 22.7 ± 1.7% |
| 6443/Kubernetes | 0.2 ± 0.0% | 0.2 ± 0.0% | 3.5 ± 0.7% |
| 1433/MSSQL | 0.2 ± 0.0% | 0.5 ± 0.1% | 15.7 ± 3.9% |
| 631/IPP | 0.1 ± 0.0% | 0.2 ± 0.0% | 0.9 ± 0.3% |
| 16993/HTTPS | 0.1 ± 0.0% | 0.1 ± 0.0% | 0.2 ± 0.0% |
| 1911/Fox | 0.1 ± 0.0% | 0.1 ± 0.0% | 0.3 ± 0.1% |
| 47808/BACnet | 0.1 ± 0.0% | 0.1 ± 0.0% | 0.2 ± 0.0% |
| 2323/Telnet | 0.1 ± 0.0% | 0.2 ± 0.0% | 4.2 ± 1.6% |
| 16992/HTTP | 0.1 ± 0.0% | 0.1 ± 0.0% | 0.2 ± 0.0% |
| 27017/MongoDB | 0.1 ± 0.0% | 0.2 ± 0.0% | 1.3 ± 0.4% |
| 502/Modbus | 0.1 ± 0.0% | 0.1 ± 0.0% | 1.3 ± 0.6% |
| 445/SMB | 0.3 ± 0.0% | 0.9 ± 0.1% | 14.3 ± 1.5% |
| 11211/Memcached | 0.1 ± 0.0% | 0.1 ± 0.0% | 0.8 ± 0.2% |
| 102/S7 | 0.1 ± 0.0% | 0.1 ± 0.0% | 0.3 ± 0.0% |
| 161/SNMPv1 | 0.1 ± 0.0% | 0.2 ± 0.0% | 2.0 ± 0.7% |
| 161/SNMPv2 | 0.1 ± 0.0% | 0.1 ± 0.0% | 1.4 ± 0.6% |
| 1900/UPnP | 1.2 ± 0.2% | 3.3 ± 0.9% | 24.9 ± 11.7% |
| 123/NTP-monlist | 0.1 ± 0.0% | 0.3 ± 0.1% | 3.8 ± 2.8% |
| Total | 1.4 ± 0.0% | 2.5 ± 0.0% | 9.9 ± 0.3% |
| Responsive | 4.3 ± 0.1% | 6.5 ± 0.1% | 18.9 ± 0.5% |
| Active | 4.8 ± 0.1% | 7.2 ± 0.1% | 20.0 ± 0.5% |

TABLE 14

Performance of sequential intelligent scans (Table 9).

| Probe | Guaranteed coverage | | |
|---|---|---|---|
| | 90% | 95% | 99% |
| ICMP | 40.3 ± 0.2% | 51.2 ± 0.3% | 72.0 ± 0.4% |
| 53/DNS-query | 9.0 ± 0.1% | 10.1 ± 0.0% | 11.7 ± 0.1% |
| 80/HTTP | 28.5 ± 0.5% | 41.9 ± 0.6% | 67.4 ± 0.8% |
| 443/HTTPS | 18.0 ± 0.2% | 29.1 ± 0.5% | 59.0 ± 0.7% |
| 7547/CWMP | 4.5 ± 0.1% | 7.2 ± 0.3% | 19.4 ± 0.8% |
| 161/SNMPv3 | 18.4 ± 0.4% | 28.9 ± 0.6% | 56.4 ± 1.2% |
| 22/SSH | 6.6 ± 0.1% | 11.3 ± 0.7% | 40.3 ± 1.0% |
| 21/FTP | 3.6 ± 0.2% | 6.6 ± 0.4% | 33.5 ± 1.8% |
| 25/SMTP | 2.2 ± 0.2% | 6.2 ± 0.9% | 34.4 ± 1.8% |
| 8080/HTTP | 18.5 ± 0.9% | 29.6 ± 1.3% | 51.5 ± 1.4% |
| 3306/MySQL | 1.1 ± 0.0% | 2.0 ± 0.1% | 7.3 ± 1.1% |
| 110/POP3 | 0.3 ± 0.0% | 0.4 ± 0.0% | 1.8 ± 0.4% |
| 143/IMAP | 0.4 ± 0.0% | 0.6 ± 0.0% | 2.6 ± 0.6% |
| 3389/RDP | 12.0 ± 1.3% | 25.4 ± 1.2% | 54.7 ± 1.8% |
| 123/NTP | 11.9 ± 0.6% | 15.5 ± 0.8% | 42.2 ± 2.5% |
| 587/SMTP | 0.3 ± 0.0% | 0.4 ± 0.0% | 0.7 ± 0.1% |
| 53/DNS-version | 9.7 ± 0.6% | 17.7 ± 0.9% | 48.5 ± 1.8% |
| 993/IMAPS | 0.3 ± 0.0% | 0.4 ± 0.0% | 1.2 ± 0.2% |
| 995/POP3S | 0.3 ± 0.0% | 0.3 ± 0.0% | 0.8 ± 0.3% |
| 465/SMTP | 0.3 ± 0.0% | 0.4 ± 0.0% | 1.1 ± 0.3% |
| 8888/HTTP | 2.1 ± 0.2% | 5.0 ± 0.4% | 29.5 ± 3.5% |
| 23/Telnet | 5.5 ± 0.5% | 6.7 ± 0.6% | 20.1 ± 2.1% |
| 5432/Postgres | 0.5 ± 0.1% | 1.4 ± 0.3% | 5.2 ± 0.5% |
| 1883/MQTT | 0.2 ± 0.1% | 0.3 ± 0.1% | 2.3 ± 0.4% |
| 8883/MQTT | 0.2 ± 0.0% | 0.3 ± 0.1% | 2.4 ± 1.0% |
| 5672/AMQP | 0.3 ± 0.1% | 0.4 ± 0.2% | 3.4 ± 0.3% |
| 5901/VNC | 0.2 ± 0.0% | 0.4 ± 0.1% | 4.8 ± 1.6% |
| 1521/Oracle | 0.2 ± 0.1% | 0.3 ± 0.1% | 4.3 ± 1.1% |
| 5902/VNC | 0.2 ± 0.0% | 0.2 ± 0.0% | 0.6 ± 0.2% |
| 5903/VNC | 0.2 ± 0.0% | 0.2 ± 0.0% | 0.3 ± 0.1% |
| 9090/Prometheus | 1.4 ± 0.2% | 4.3 ± 0.7% | 24.6 ± 5.5% |
| 9200/Elasticsearch | 0.2 ± 0.0% | 0.3 ± 0.0% | 3.7 ± 1.6% |
| 6379/Redis | 0.2 ± 0.0% | 0.2 ± 0.0% | 1.8 ± 0.2% |
| 5900/VNC | 0.5 ± 0.2% | 3.3 ± 0.6% | 33.3 ± 3.5% |
| 6443/Kubernetes | 0.2 ± 0.0% | 0.2 ± 0.0% | 5.6 ± 1.8% |
| 1433/MSSQL | 0.4 ± 0.1% | 1.6 ± 0.8% | 20.9 ± 3.0% |
| 631/IPP | 0.2 ± 0.0% | 0.2 ± 0.0% | 1.5 ± 0.4% |
| 16993/HTTPS | 0.1 ± 0.0% | 0.2 ± 0.0% | 0.3 ± 0.1% |
| 1911/Fox | 0.1 ± 0.0% | 0.1 ± 0.0% | 0.5 ± 0.2% |

TABLE 14-continued

Performance of sequential intelligent scans (Table 9).

| Probe | Guaranteed coverage | | |
|---|---|---|---|
| | 90% | 95% | 99% |
| 47808/BACnet | 0.1 ± 0.0% | 0.1 ± 0.0% | 0.3 ± 0.0% |
| 2323/Telnet | 0.2 ± 0.0% | 0.4 ± 0.1% | 8.3 ± 3.3% |
| 16992/HTTP | 0.1 ± 0.0% | 0.1 ± 0.0% | 0.4 ± 0.1% |
| 27017/MongoDB | 0.2 ± 0.0% | 0.4 ± 0.1% | 3.2 ± 1.0% |
| 502/Modbus | 0.1 ± 0.0% | 0.2 ± 0.0% | 3.0 ± 1.5% |
| 445/SMB | 0.9 ± 0.2% | 2.3 ± 0.4% | 21.7 ± 4.1% |
| 11211/Memcached | 0.1 ± 0.0% | 0.2 ± 0.0% | 1.2 ± 0.4% |
| 102/S7 | 0.1 ± 0.0% | 0.1 ± 0.0% | 0.8 ± 0.9% |
| 161/SNMPv1 | 3.4 ± 0.5% | 5.1 ± 0.9% | 26.9 ± 5.3% |
| 161/SNMPv2 | 1.4 ± 0.6% | 5.0 ± 2.3% | 22.7 ± 8.9% |
| 1900/UPnP | 4.8 ± 0.8% | 7.0 ± 1.5% | 34.8 ± 10.5% |
| 123/NTP-monlist | 5.8 ± 2.1% | 9.5 ± 3.3% | 46.9 ± 20.0% |
| Total | 4.2 ± 0.1% | 6.7 ± 0.1% | 18.5 ± 0.7% |
| Responsive | 9.3 ± 0.2% | 13.6 ± 0.4% | 30.3 ± 0.9% |
| Active | 10.1 ± 0.2% | 14.5 ± 0.4% | 31.7 ± 0.9% |

What is claimed is:

1. A computer-implemented method for scanning a computer network, comprising:
   a) sending, by a computer processor, a particular network probe to a particular port of a network address in a computer network;
   b) receiving, by the computer processor, a response to the particular network probe from the network address;
   c) appending, the computer processor, the response for the particular port to a set of features forming a feature vector associated with the network address, where the feature vector includes at least two features and each feature of the at least two features indicates status of a different port at the network address;
   d) determining, by the computer processor, a next port to probe at the network address, where the next port is selected dynamically according to the set of features from the feature vector; and
   e) predicting, by the computer processor, the response of the next port using the feature vector and a model, where the model is trained using a machine learning method and outputs a probability that the next port will respond to a given network probe in a desired manner and the next port differs from the particular port.

2. The method of claim 1 further comprises sending another network probe to the next port of the network address in response to the probability that a given network address will respond in a desired manner exceeds a threshold.

3. The method of claim 2 further comprises
   receiving, by the computer processor, a response to the another network probe from the network address; and
   repeating steps b)-e) for the response from the another network probe.

4. The method of claim 1 further comprises determining the next port at the network address in accordance with a sequence of probes.

5. The method of claim 4 wherein the sequence of probes is determined by training a set of classifiers with training data, where the training data represents a plurality of network probes across a set of different types of ports;
   ordering ports in the set of different types of ports to form a predefined sequence, where the ports are ordered according to importance of a given port for predicting response of another port.

6. The method of claim 5 further comprises quantifying contributions of each feature using SHAP (SHapley Additive explanation) values.

7. The method of claim 5 further comprises ordering ports in the set of different types of probes using a hill climbing method.

8. The method of claim 1 wherein the set of features includes at least one of a geographic location for the network address and ownership information for the network address.

9. The method of claim 1 wherein the model is further defined as one or more decision trees and the machine learning method is further defined as gradient-boosting method.

10. A computer-implemented method for scanning a computer network, comprising:
    a) sending, by a computer processor, a network probe to a particular port at a network address in a computer network;
    b) receiving, by the computer processor, a response to the network probe from the network address;
    c) appending, the computer processor, the response to a set of features forming a feature vector associated with the network address, where the feature vector includes at least two features and each feature of the at least two features indicates status of a different port at the network address;
    d) determining, by the computer processor, a next port at the network address to probe, where the next port is selected dynamically according to the set of features from the feature vector; and
    e) predicting, by the computer processor, the response from the next port using the feature vector and a model, where the model is trained using a machine learning method and outputs a probability that the next port will respond to a given network probe in a desired manner and the next port differs from the particular port.

11. The method of claim 10 further comprises sending another network probe to the next port in response to the probability that a given port will respond in a desired manner exceeds a threshold.

12. The method of claim 11 further comprises receiving, by the computer processor, a response to the another network probe from the network address; and
    repeating steps b)-e) for the response from the another network probe.

13. The method of claim 10 further comprises determining the next port at the network address to probe in accordance with a sequence of probes.

14. The method of claim 13 wherein the sequence of probes is determined by training a set of classifiers with training data, where the training data represents a plurality of network probes across a set of different types of ports;
    ordering ports in the set of different types of ports to form a predefined sequence, where the ports are ordered according to importance of a given port for predicting response of another port.

15. The method of claim 10 wherein determining a next port at the network address to probe is selected dynamically.

16. The method of claim 10 wherein the set of features includes at least one of a geographic location for the network address and ownership information for the network address.

17. A network scanner, comprising
    a processor; and
    a storage medium having computer program instructions stored thereon, when executed by the processor, perform to:

sending, by a computer processor, a network probe to a particular port of a network address in a computer network;
receiving, by the computer processor, a response to the network probe from the network address;
appending, the computer processor, the response for the particular port to a set of features forming a feature vector associated with the network address, where the feature vector includes at least two features and each feature of the at least two features indicates status of a given port at the network address;
determining, by the computer processor, a next port to probe at the network address, where the next port is selected dynamically according to the set of features from the feature vector; and
predicting, by the computer processor, the response from the next port using the feature vector and a model, where the model is trained using a machine learning method and outputs a probability that the next port will respond to a given network probe in a desired manner and the next port differs from the particular port.

* * * * *

UNITED STATES PATENT AND TRADEMARK OFFICE
CERTIFICATE OF CORRECTION

PATENT NO. : 12,107,749 B2
APPLICATION NO. : 18/033834
DATED : October 1, 2024
INVENTOR(S) : Armin Sarabi et al.

Page 1 of 1

It is certified that error appears in the above-identified patent and that said Letters Patent is hereby corrected as shown below:

In the Claims

At Column 23, Claim number 3, Line number 52, after "comprises", insert --:--;

At Column 24, Claim number 6, Line number 3, delete "explanation)" and insert --exPlanation)--;

At Column 24, Claim number 8, Line number 7, after "method of", insert --claim--; and At Column 24, Claim number 16, Line number 60, after "method of", insert --claim--.

Signed and Sealed this
Fifteenth Day of July, 2025

Coke Morgan Stewart
*Acting Director of the United States Patent and Trademark Office*